United States Patent
Su

(10) Patent No.: US 10,993,123 B2
(45) Date of Patent: Apr. 27, 2021

(54) DATA SENDING METHOD AND APPARATUS

(71) Applicant: Huawei Technologies Co., Ltd., Shenzhen (CN)

(72) Inventor: Yuxin Su, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 15/906,398

(22) Filed: Feb. 27, 2018

(65) Prior Publication Data

US 2018/0192299 A1 Jul. 5, 2018

Related U.S. Application Data

(63) Continuation of application No. PCT/CN2015/088679, filed on Aug. 31, 2015.

(51) Int. Cl.
*H04W 16/28* (2009.01)
*H04W 88/08* (2009.01)
*H04W 76/40* (2018.01)

(52) U.S. Cl.
CPC ........... *H04W 16/28* (2013.01); *H04W 76/40* (2018.02); *H04W 88/08* (2013.01)

(58) Field of Classification Search
CPC ..... H04W 16/24; H04W 16/28; H04W 16/30; H04W 16/32; H04J 15/00
USPC ............................................. 455/422.1, 446
See application file for complete search history.

(56) References Cited

U.S. PATENT DOCUMENTS

| 5,606,729 A | * | 2/1997 | D'Amico | H04W 28/08 455/226.2 |
| 2007/0183432 A1 | * | 8/2007 | Kim | H04L 1/0001 370/400 |
| 2011/0085492 A1 | * | 4/2011 | Kim | H04W 16/26 370/328 |

FOREIGN PATENT DOCUMENTS

| CN | 101145818 A | 3/2008 |
| CN | 101568121 A | 10/2009 |
| CN | 102857286 A | 1/2013 |
| CN | 104779986 A | 7/2015 |
| WO | 2013107121 A1 | 7/2013 |

OTHER PUBLICATIONS

Li, X-j., "Research on Performances of Multibeam Intelligent Antenna," Information Technology, vol. 28, No. 8, Aug. 2004, 2 pages.

* cited by examiner

*Primary Examiner* — Joshua L Schwartz
(74) *Attorney, Agent, or Firm* — Slater Matsil, LLP

(57) ABSTRACT

A data sending method and a base station is provided. The method includes: determining a coverage zone set to a covered state in a cell at a current moment, where the cell includes multiple coverage zones, at least one set to the covered state in the cell at one moment, and coverage zones set to the covered state at different moments are different; obtaining a common channel beam of the cell at the current moment, where the common channel beam of the cell at the current moment points to the coverage zone set to the covered state in the cell at the current moment; and sending the common channel beam of the cell at the current moment to the coverage zone set to the covered state in the cell at the current moment.

20 Claims, 11 Drawing Sheets

---

101 — A base station determines a coverage zone set to a covered state in a cell at a current moment, where the cell includes multiple coverage zones, there is at least one coverage zone set to the covered state in the cell at one moment, and coverage zones set to the covered state in the cell at different moments are different 102 — The base station performs beamforming on data carried by a common channel to obtain a common channel beam of the cell at the current moment, where the common channel beam of the cell at the current moment points to the coverage zone set to the covered state in the cell at the current moment 103 — The base station sends the common channel beam of the cell at the current moment to the coverage zone set to the covered state in the cell at the current moment Coverage zone set to a covered state at a moment t1

Coverage zone set to a silent state at the moment t1

DATA SENDING METHOD AND APPARATUS

CROSS-REFERENCE TO RELATED APPLICATIONS

This application is a continuation of International Application No. PCT/CN2015/088679, filed on Aug. 31, 2015, the disclosure of which is hereby incorporated by reference in its entirety.

TECHNICAL FIELD

The present invention relates to the field of communications technologies, and in particular, to a data sending method and apparatus.

BACKGROUND

As a mobile service develops, the mobile service imposes an increasingly high requirement for spectral efficiency of wireless communications. A manner to improve the spectral efficiency is a multiple-antenna technology, that is, a base station is configured with multiple antennas. Different user terminals in a cell of the base station require different service data. Therefore, the base station can perform BF (beamforming) on data carried by a service channel to obtain service channel beams of different user terminals, and then send the service channel beams to the user terminals by using the multiple antennas, thereby efficiently using channel spatial irrelevance.

However, data carried by a common channel needs to provide a service for UEs in an entire cell. Therefore, the base station broadcasts the data carried by the common channel across the entire cell. As shown in FIG. 1, for the data carried by the common channel, the base station uses a sending manner of broadcasting, and for the data carried by the service channel, the base station uses a sending manner of BF. Consequently, a coverage area of the data carried by the common channel is smaller than a coverage area of the data carried by the service channel.

SUMMARY

Embodiments of the present invention provide a data sending method and apparatus, so as to resolve a technical problem that a coverage area of data carried by a common channel is relatively small in the prior art.

A first aspect of an embodiment of the present invention provides a data sending method. The method includes determining, by a base station, a coverage zone set to a covered state in a cell at a current moment, where the cell includes multiple coverage zones, there is at least one coverage zone set to the covered state in the cell at one moment, and coverage zones set to the covered state in the cell at different moments are different. The method also includes performing, by the base station, beamforming on data carried by a common channel to obtain a common channel beam of the cell at the current moment, where the common channel beam of the cell at the current moment points to the coverage zone set to the covered state in the cell at the current moment. The method also includes sending, by the base station, the common channel beam of the cell at the current moment to the coverage zone set to the covered state in the cell at the current moment.

With reference to the first aspect, in a first possible implementation of the first aspect, a line segment between any point on an edge of the cell and a point at which the base station is located crosses over at least two coverage zones included in the cell.

With reference to the first aspect or the first possible implementation of the first aspect, in a second possible implementation of the first aspect, a coverage area of the base station includes multiple cells, and coverage zones set to the covered state in any two neighboring cells in the multiple cells at a same moment are not adjacent to each other.

With reference to any one of the first aspect, or the first possible implementation of the first aspect and the second possible implementation of the first aspect, in a third possible implementation of the first aspect, the performing, by the base station, beamforming on data carried by a common channel to obtain a common channel beam of the cell at the current moment includes: performing, by the base station, M different space time coding or space frequency coding on the data carried by the common channel to obtain M data streams, where M is an integer greater than or equal to 1; and performing, by the base station, beamforming on the M data streams to obtain data streams corresponding to M common channel beams of the cell at the current moment.

With reference to any one of the first aspect, or the first possible implementation of the first aspect to the third possible implementation of the first aspect, in a fourth possible implementation of the first aspect, before the determining, by a base station, a coverage zone set to a covered state in a cell at a current moment, the method further includes: setting, by the base station, states of each coverage zone in the cell at various moments, where the state of each coverage zone in the cell is set to the covered state or a silent state, and the various moments include the current moment.

A second aspect of an embodiment of the present invention provides a base station. The base station includes a memory, configured to store coverage zones set to a covered state in a cell at different moments, where the cell includes multiple coverage zones, there is at least one coverage zone set to the covered state in the cell at one moment, and coverage zones set to the covered state in the cell at different moments are different. The base station also includes a processor, connected to the memory by using a bus, and configured to determine a coverage zone set to the covered state in the cell at a current moment; and perform beamforming on data carried by a common channel to obtain a common channel beam of the cell at the current moment, where the common channel beam of the cell at the current moment points to the coverage zone set to the covered state in the cell at the current moment. The base station also includes a transmitter, connected to the processor by using the bus, and configured to send the common channel beam of the cell at the current moment to the coverage zone set to the covered state in the cell at the current moment.

With reference to the second aspect, in a first possible implementation of the second aspect, a line segment between any point on an edge of the cell and a point at which the base station is located crosses over at least two coverage zones included in the cell.

With reference to the second aspect or the first possible implementation of the second aspect, in a second possible implementation of the second aspect, a coverage area of the base station includes multiple cells, and coverage zones set to the covered state in any two neighboring cells in the multiple cells at a same moment are not adjacent to each other.

With reference to any one of the second aspect, or the first possible implementation of the second aspect and the second possible implementation of the second aspect, in a third possible implementation of the second aspect, the processor is configured to perform M different space time coding or space frequency coding on the data carried by the common channel to obtain M data streams, where M is an integer greater than or equal to 1; and perform beamforming on the M data streams to obtain data streams corresponding to M common channel beams of the cell at the current moment.

With reference to any one of the second aspect, or the first possible implementation of the second aspect to the third possible implementation of the second aspect, in a fourth possible implementation of the second aspect, the processor is further configured to: set states of each coverage zone in the cell at various moments, where the state of each coverage zone in the cell is set to the covered state or a silent state, and the various moments include the current moment.

With reference to any one of the second aspect, or the first possible implementation of the second aspect to the fourth possible implementation of the second aspect, in a fifth possible implementation of the second aspect, the processor is further configured to: perform steps in any possible implementation of the method according to the first aspect of the embodiment of the present invention, and the transmitter is configured to perform transmission under control of the processor.

A third aspect of an embodiment of the present invention provides a data sending apparatus. The apparatus also includes a determining unit, configured to determine a coverage zone set to a covered state in a cell at a current moment, where the cell includes multiple coverage zones, there is at least one coverage zone set to the covered state in the cell at one moment, and coverage zones set to the covered state in the cell at different moments are different. The apparatus also includes a beamforming unit, configured to perform beamforming on data carried by a common channel to obtain a common channel beam of the cell at the current moment, where the common channel beam of the cell at the current moment points to the coverage zone set to the covered state in the cell at the current moment. The apparatus also includes a sending unit, configured to send the common channel beam of the cell at the current moment to the coverage zone set to the covered state in the cell at the current moment.

With reference to the third aspect, in a first possible implementation of the third aspect, a line segment between any point on an edge of the cell and a point at which the apparatus is located crosses over at least two coverage zones included in the cell.

With reference to the third aspect or the first possible implementation of the third aspect, in a second possible implementation of the third aspect, a coverage area of the apparatus includes multiple cells, and coverage zones set to the covered state in any two neighboring cells in the multiple cells at a same moment are not adjacent to each other.

With reference to any one of the third aspect, or the first possible implementation of the third aspect and the second possible implementation of the third aspect, in a third possible implementation of the third aspect, the beamforming unit includes: a coding subunit, configured to perform M different space time coding or space frequency coding on the data carried by the common channel to obtain M data streams, where M is an integer greater than or equal to 1; and the beamforming subunit is configured to perform beamforming on the M data streams to obtain data streams corresponding to M common channel beams of the cell at the current moment.

With reference to any one of the third aspect, or the first possible implementation of the third aspect to the third possible implementation of the third aspect, in a fourth possible implementation of the third aspect, the apparatus further includes: a setting unit, configured to set states of each coverage zone in the cell at various moments, where the state of each coverage zone in the cell is set to the covered state or a silent state, and the various moments include the current moment.

One or more technical solutions provided in the embodiments of the present invention have at least the following technical effects or advantages.

In the embodiments of the present invention, the cell of the base station includes multiple coverage zones, and there is at least one coverage zone set to the covered state in the cell at one moment. The base station first determines the coverage zone set to the covered state in the cell at the current moment, and then performs beamforming on the data carried by the common channel to obtain the common channel beam of the cell at the current moment, where the common channel beam of the cell at the current moment points to the coverage zone set to the covered state in the cell at the current moment. Finally, the base station sends the common channel beam of the cell at the current moment to the coverage zone set to the covered state in the cell at the current moment. Coverage zones set to the covered state in the cell at different moments are different. Therefore, the base station sends the data carried by the common channel to different coverage zones in the cell at different moments, so as to further send the common channel beam to the entire cell. With the solutions provided in the embodiments of the present invention, on the one hand, for the data carried by the common channel, the base station uses a sending manner of BF in which energy is relatively concentrated, compared with a sending manner of broadcasting. On the other hand, the data carried by the common channel is sent to each coverage zone included in the cell in turn. This resolves the technical problem that the coverage area of the data carried by the common channel is relatively small in the prior art.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
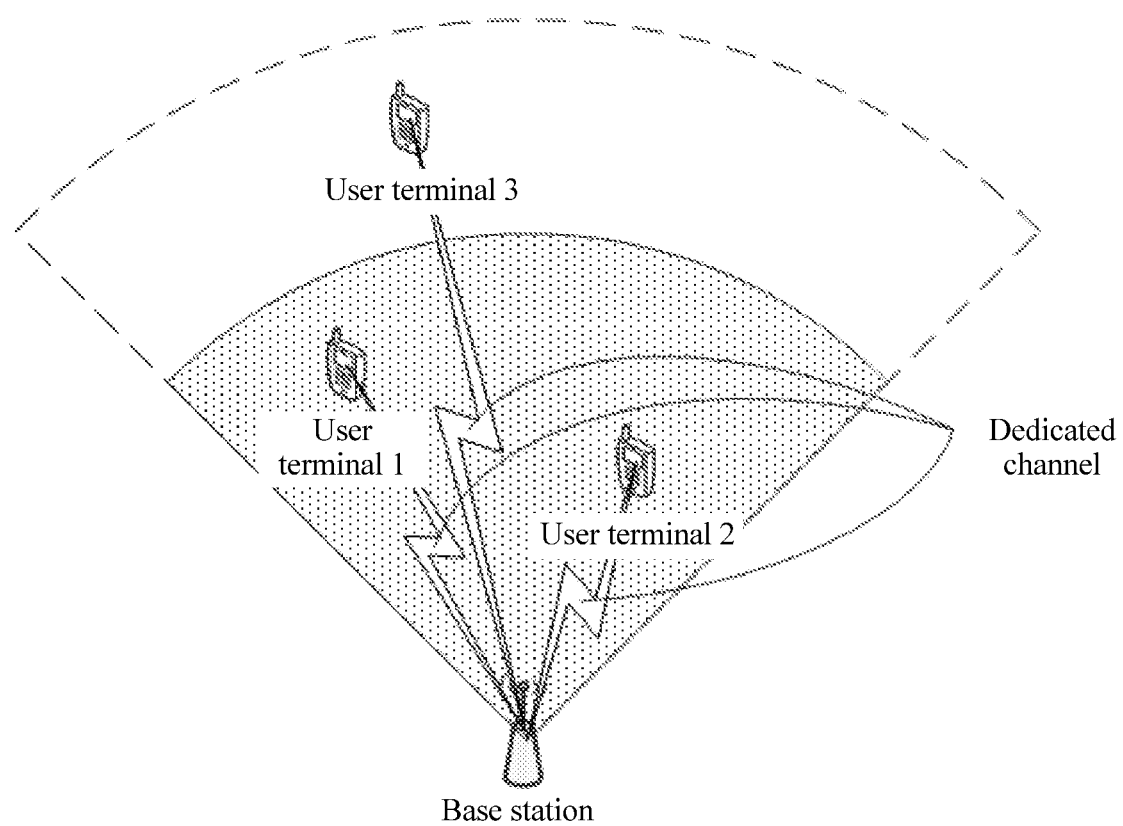
FIG. 1 is a schematic diagram of a communications system that is applicable to a data sending method according to an embodiment of the present invention.

Referring to FIG. 1, FIG. 1 is a schematic diagram of a communications system. The communications system is applicable to a data sending method according to an embodiment of the present invention. The communications system includes: a base station and multiple user terminals. For example, in FIG. 1, there are three user terminals, and the three user terminals are a user terminal 1, a user terminal 2, and a user terminal 3 respectively.

The system shown in FIG. 1 may be: a Global System for Mobile Communications (GSM), a general packet radio service (GPRS) system, a Code Division Multiple Access (CDMA) system, a Wideband Code Division Multiple Access (WCDMA) system, a Long Term Evolution (LTE, Long Term Evolution) system, and various wireless communications systems that subsequently evolve and develop, including but not limited to a 5th Generation Mobile Communications System (5G, 5th Generation) and the like. In practical application, the communications system may be a mobile access system, or may be a fixed access system. The communications system is applicable to various radio access technologies. Actually, any system that includes user equipment and a base station that supports multiple-antenna beamforming is applicable to the data sending method provided in this embodiment of the present invention.

The base station in FIG. 1 may be a base transceiver station (BTS) in GSM or CDMA, a NodeB in WCDMA, an evolved NodeB (eNB or e-NodeB) in LTE, or a network device that implements a similar function in a subsequent evolved system. This is not limited in the present invention. It should be noted that, a corresponding change, such as use of a distributed base station, of a form of the network device according to an actual network deployment requirement also falls within the protection scope of the present invention.

The user terminal in FIG. 1 may be: user equipment (UE), also referred to as a mobile terminal, mobile user equipment, or the like, and may communicate with one or more core networks (CN) using a radio access network (RAN). The user equipment may be a mobile phone or a computer that has a mobile terminal, for example, a portable, pocket-size, handheld, computer built-in, or in-vehicle mobile apparatus.

An embodiment of the present invention first provides a data sending method. The method can expand a coverage area of data carried by a common channel.

In this embodiment of the present invention, a cell of a base station is divided into multiple coverage zones. In coverage zones in the cell at different moments, the base station first determines a coverage zone set to a covered state at a current moment in the cell; then performs beamforming on data carried by a common channel to obtain a common channel beam that points to the coverage zone set to the covered state in the cell at the current moment; and finally, sends the obtained common channel beam to the coverage zone set to the covered state in the cell at the current moment. Coverage zones set to the covered state in the cell at different moments are different. Therefore, the base station sends the data carried by the common channel to different coverage zones at different moments, so as to further send the data carried by the common channel to the entire cell.

Figure 2:
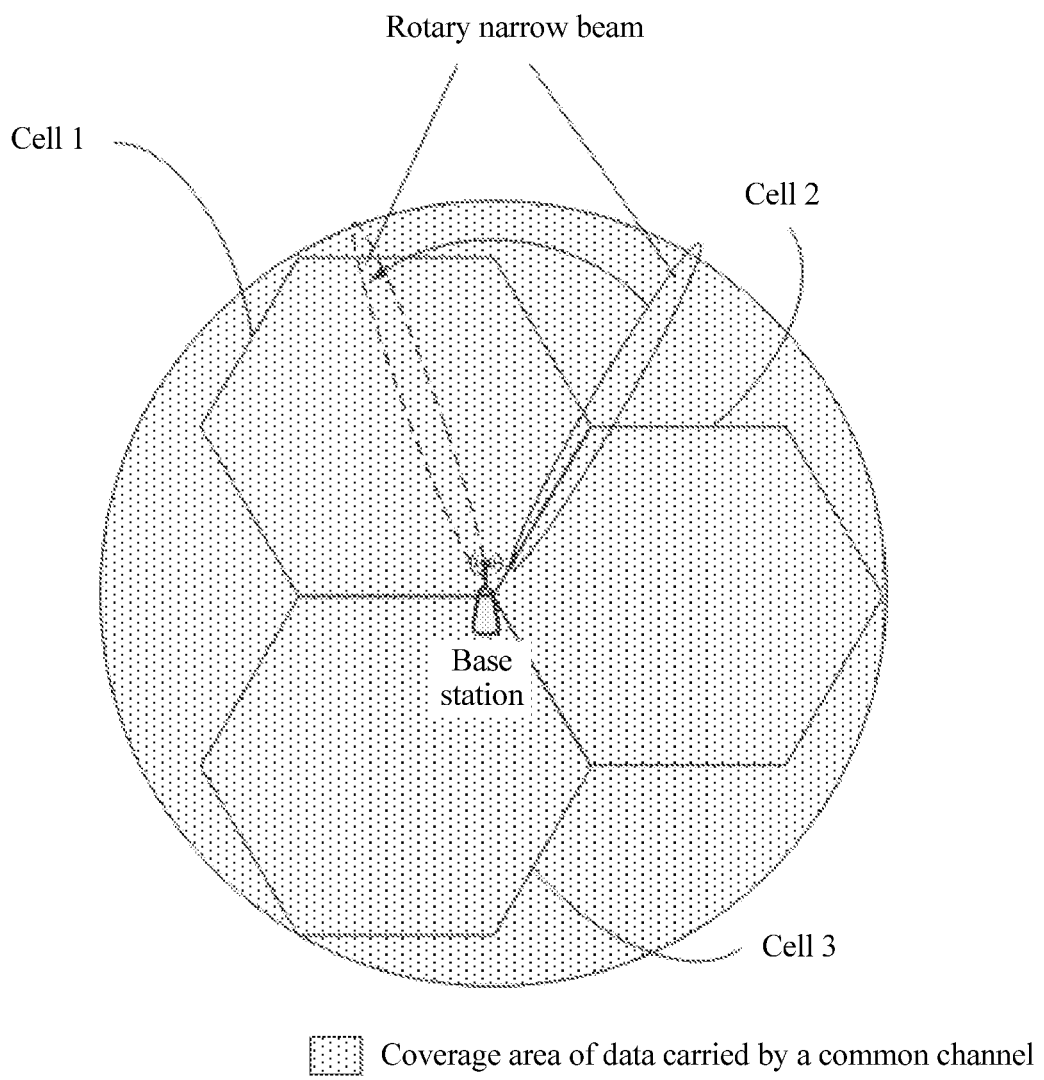
FIG. 2 is a schematic diagram of sending data carried by a common channel in the prior art.
Figure 3:
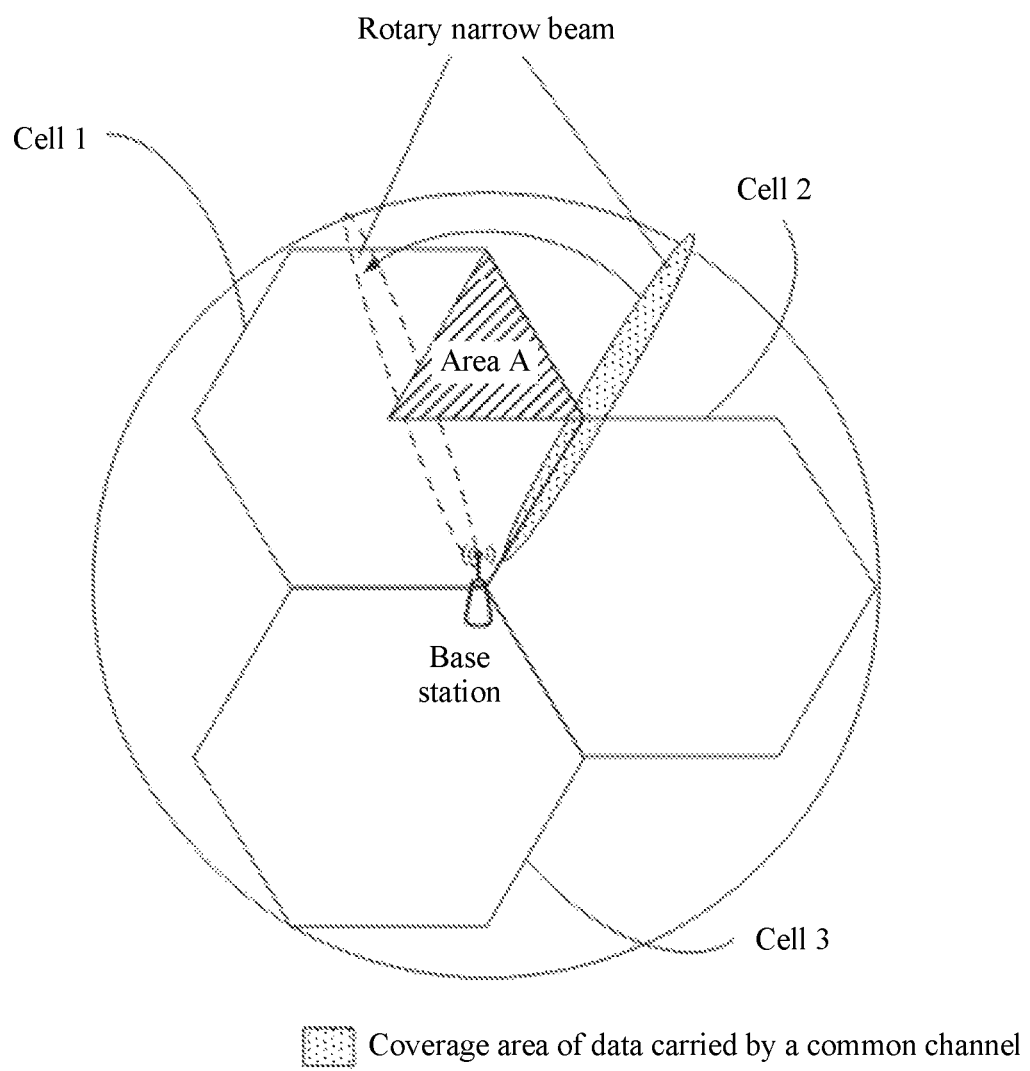
FIG. 3 is a schematic diagram of a comparison of sending data carried by a common channel separately provided by the prior art and an embodiment of the present invention.

It has been described in the background that the coverage area of the data carried by the common channel is smaller than a coverage area of data carried by a service channel at present. Therefore, a solution provided in the prior art is as follows: The base station uses a rotary narrow beam that has a rate of a preset radian/second to send the data carried by the common channel. In this way, the coverage area of the data carried by the common channel is expanded to the entire cell, as shown in FIG. 2. However, this solution is not flexible enough in practical application. A reason is as follows: An area projected by the narrow beam is fixed to a sector whose center is the base station and whose radii are line segments separately between any two points on an edge of the cell and a point at which the base station is located. The narrow beam rotates around the base station one circle, and the data carried by the common channel covers a circle that centers on the base station. This is not applicable to an application scenario in which the data carried by the common channel needs to be sent to an area that changes flexibly. As shown in FIG. 3, the data carried by the common channel needs to be sent to an area A. If the solution shown in FIG. 2 is used, the rotary narrow beam needs to rotate a corresponding angle, so that the data carried by the common channel covers a sector that includes the area A. In this way, the data carried by the common channel not only covers the area A, but also covers another area other than the area A. Therefore, in the prior, the narrow beam cannot be individually projected to the area that keeps a specific distance from the base station.

In consideration of a disadvantage in the solution shown in FIG. 2, in this embodiment of the present invention, a line segment between any point on the edge of the cell and the point at which the base station is located crosses over at least two coverage zones in the cell. That is, the cell is divided in multiple directions. The edge of the cell is divided, so as to make the edge of the cell belong to different coverage zones. Moreover, the line segment between any point on the edge of the cell and the point at which the base station is located is divided, so as to make the line segment belong to different coverage zones. In this way, the coverage zone is not always a sector; instead, the coverage zone changes flexibly. This is applicable to an application scenario in which the data carried by the common channel needs to be individually sent to an area that keeps a specific distance from the base station.

Figure 4:
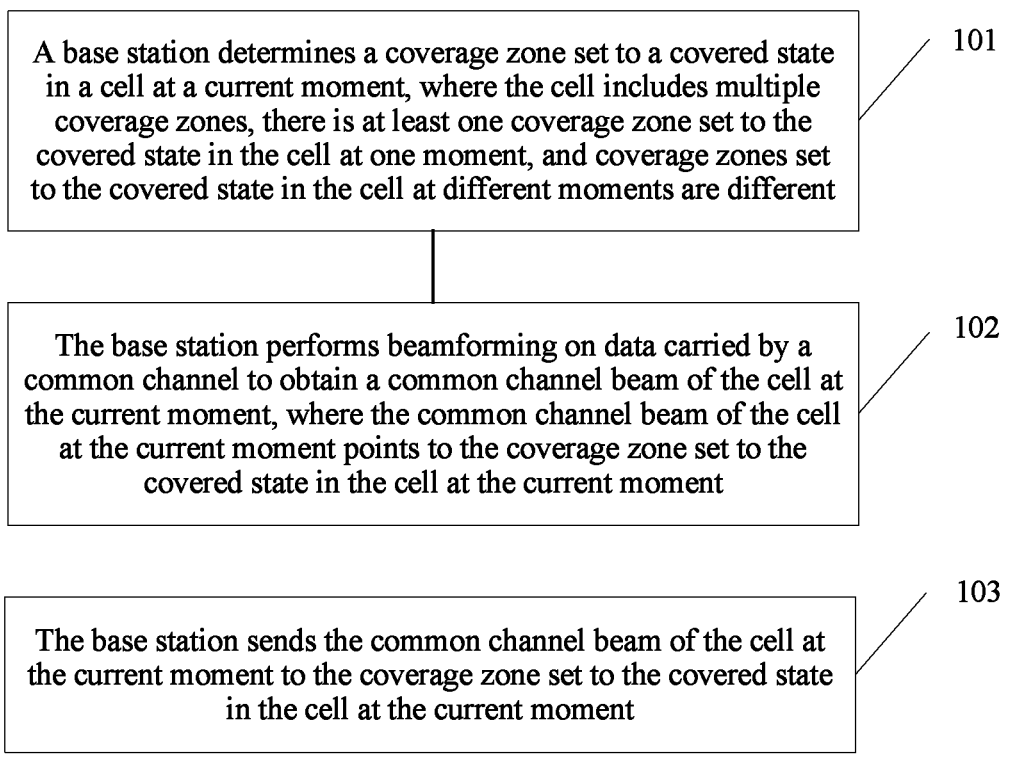
FIG. 4 is a flowchart of a data sending method according to an embodiment of the present invention.

A data sending method provided in an embodiment of the present invention is specifically described below. Referring to FIG. 4, the method includes the following steps.

Step 101: A base station determines a coverage zone set to a covered state in a cell at a current moment, where the cell includes multiple coverage zones, there is at least one coverage zone set to the covered state in the cell at one moment, and coverage zones set to the covered state in the cell at different moments are different.

Step 102: The base station performs beamforming on data carried by a common channel to obtain a common channel beam of the cell at the current moment, where the common channel beam of the cell at the current moment points to the coverage zone set to the covered state in the cell at the current moment.

Step 103: The base station sends the common channel beam of the cell at the current moment to the coverage zone set to the covered state in the cell at the current moment.

In this embodiment of the present invention, the cell of the base station is divided into finer partitions. Each partition is referred to as a coverage zone. The coverage zones need to be consecutive and to avoid overlapping with each other as far as possible. In step 101, the base station needs to determine the coverage zone set to the covered state in the cell at the current moment. Therefore, before step 101, states of each coverage zone in the cell at different moments need to be set. A coverage zone in the cell is set to the covered state at one moment, and this is to notify the base station that the data carried by the common channel can be sent to the coverage zone in the cell at the moment.

Figure 7:
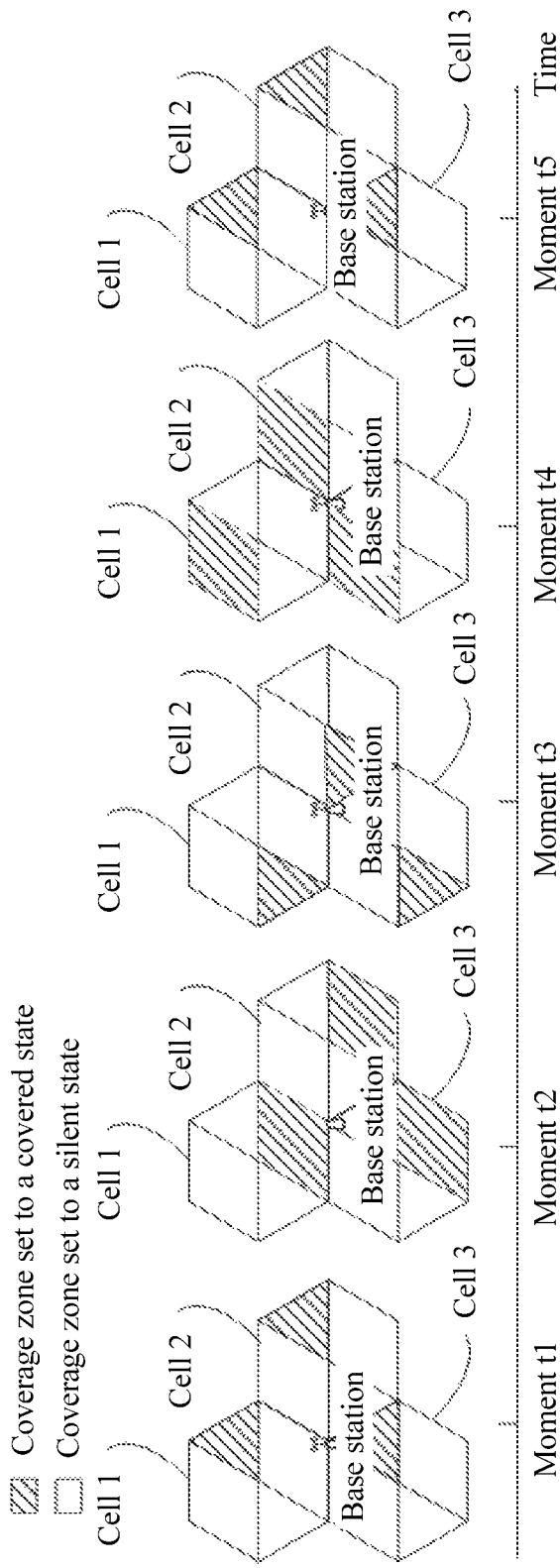
FIG. 7 is a first possible schematic diagram of coverage zones preset to a covered state in a cell 1, a cell 2, and a cell 3 at moments t1 to t5 according to an embodiment of the present invention.
Figure 8:
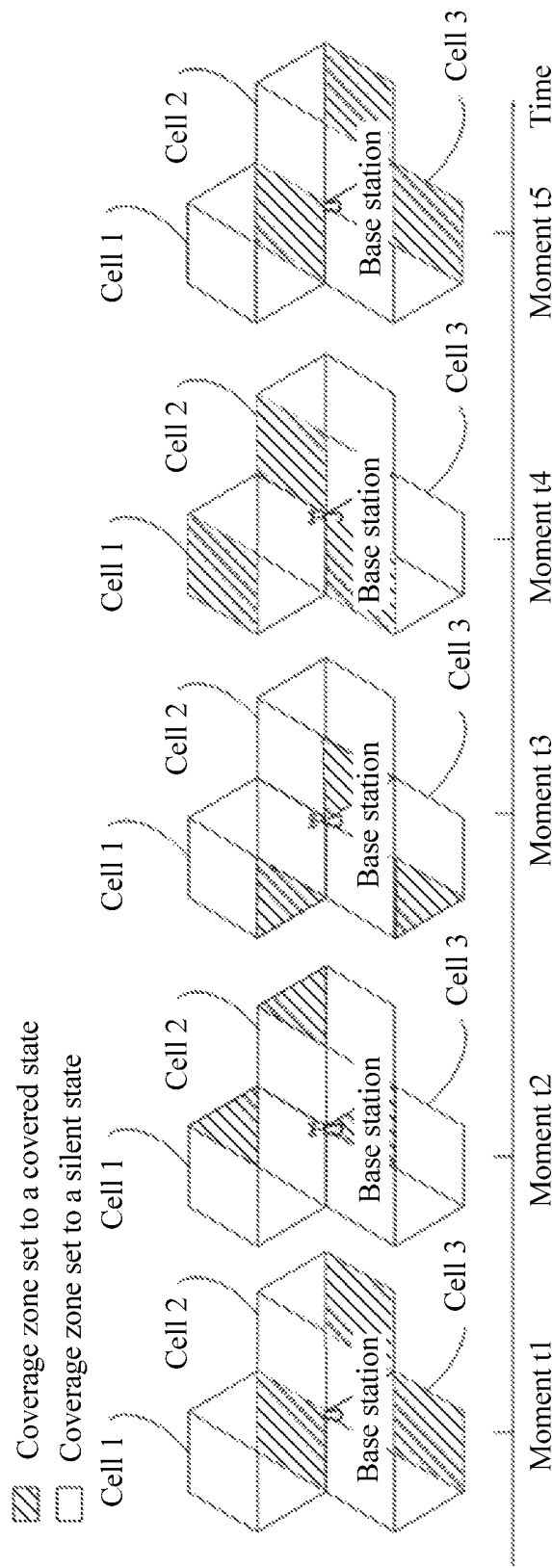
FIG. 8 is a second possible schematic diagram of coverage zones preset to a covered state in a cell 1, a cell 2, and a cell 3 at moments t1 to t5 according to an embodiment of the present invention.
Figure 9:
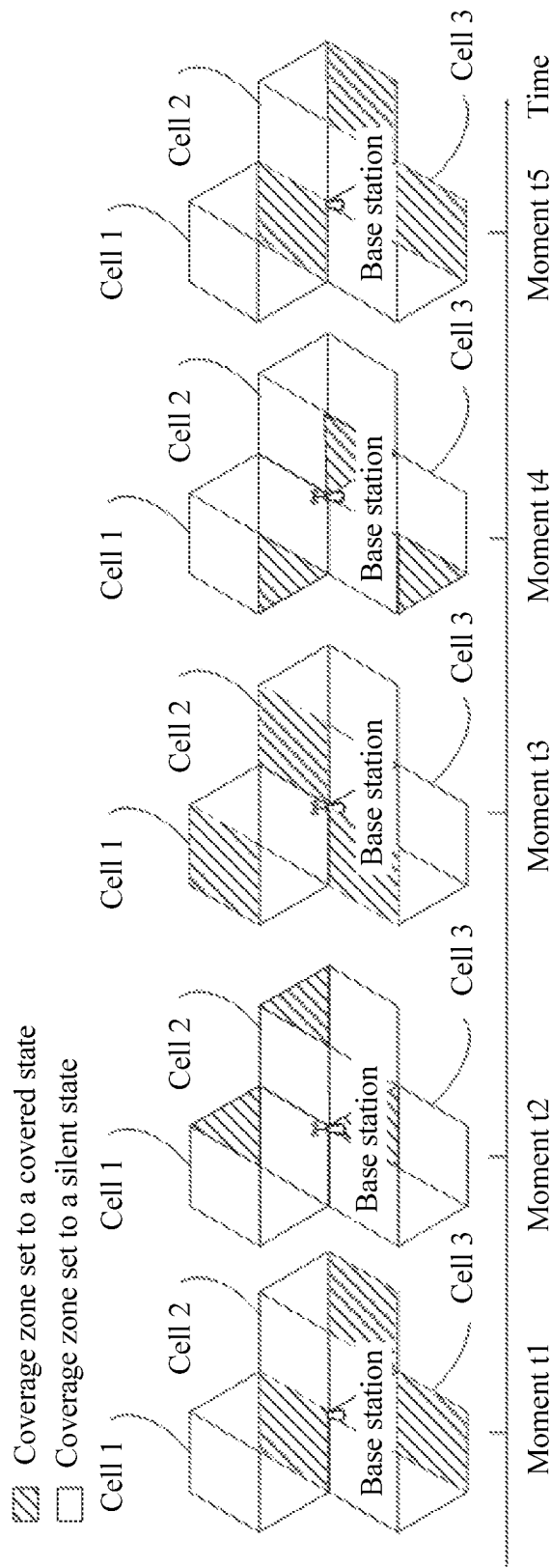
FIG. 9 is a third possible schematic diagram of coverage zones preset to a covered state in a cell 1, a cell 2, and a cell 3 at moments t1 to t5 according to an embodiment of the present invention.

In this embodiment of the present invention, the coverage zone in the covered state may be set in real time by the base station according to a network condition at a current moment. In this case, a relationship between the coverage zone set to the covered state and time is variable. The coverage zone set to the covered state varies with time, because network conditions are different at different moments. Referring to FIG. 7 to FIG. 9, FIG. 7 to FIG. 9 are possible schematic diagrams of coverage zones that are set to the covered state in the cell at different moments by the base station.

The coverage zones in the covered state may also be preset by the base station. In this case, the relationship between the coverage zone set to the covered state and time is fixed. The coverage zone set to the covered state does not vary with time. If the coverage zone of the base station that is set to the covered state is preset by the base station, before the base station determines the coverage zones set to the covered state in the cell at the current moment, the following is further included.

The base station sets states of each coverage zone in the cell at various moments, where the state of each coverage zone in the cell is set to the covered state or a silent state, the various moments include the current moment, and N is an integer greater than or equal to 2.

For example, the base station needs to determine coverage zones set to the covered state in a cell 1, a cell 2, and a cell 3 at moments t1 to t4. Before the moment t1, the base station first sets states of each coverage zone in the cell 1, the cell 2, and the cell 3 at the moments t1 to t4. Each coverage zone is fixedly set to the covered state or the silent state.

The schematic diagram of coverage zones that are set to the covered state in the cell at different moments by the base station may be any one of FIG. 7 to FIG. 9. After the base station sets the coverage zone in the cell at different moments to the covered state or another state, step 101 can be performed.

In this embodiment of the present invention, the state of each coverage zone in the cell at one moment may be set to the covered state or the silent state. In the cell, coverage zones set to the silent state are more than coverage zones set to the covered state at one moment. If a coverage zone in the cell is set to the covered state at one moment, it indicates that the base station can send the data carried by the common channel to the coverage zone in the cell at the moment.

One or more coverage zones among coverage zones in the cell may be set to the covered state at one moment. If multiple coverage zones in the cell are set to the covered state at one moment, the multiple coverage zones set to the covered state are usually different. Coverage zones set to the covered state in the cell at different moments are different, and coverage zones set to the covered state at multiple moments can cover the entire cell.

Figure 6:
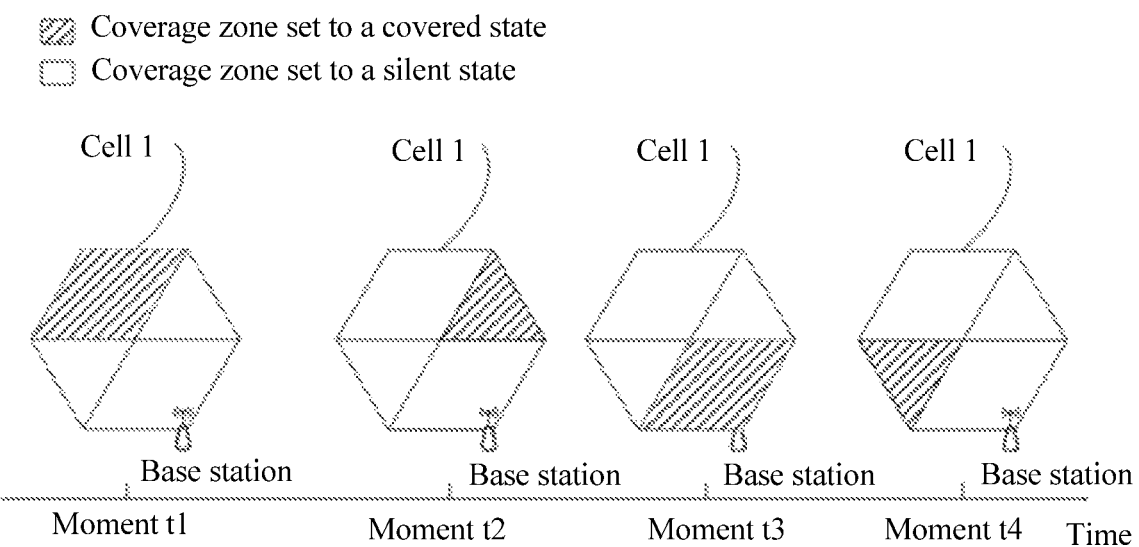
FIG. 6 is a schematic diagram of coverage zones preset to a covered state in a cell 1 at moments t1 to t5 according to an embodiment of the present invention.

Referring to FIG. 6, a cell 1 is used as an example. FIG. 6 shows coverage zones set to the covered state in the cell 1 at a moment t1, a moment t2, a moment t3, and a moment t4. It can be seen from FIG. 6 that the coverage zones set to the covered state in the cell 1 at the moment t1, the moment t2, the moment t3, and the moment t4 are different. The coverage zones set to the covered state in the cell 1 at the moment t1, the moment t2, the moment t3, and the moment t4 jointly cover the cell 1.

A coverage area of the base station usually can be divided into multiple cells, and each cell can be divided into multiple coverage zones. Coverage zones set to the covered state in any two neighboring cells in the multiple cells of the base station at a same moment are not adjacent to each other, so as to reduce mutual interference between data carried by common channels in the cells.

Figure 5:
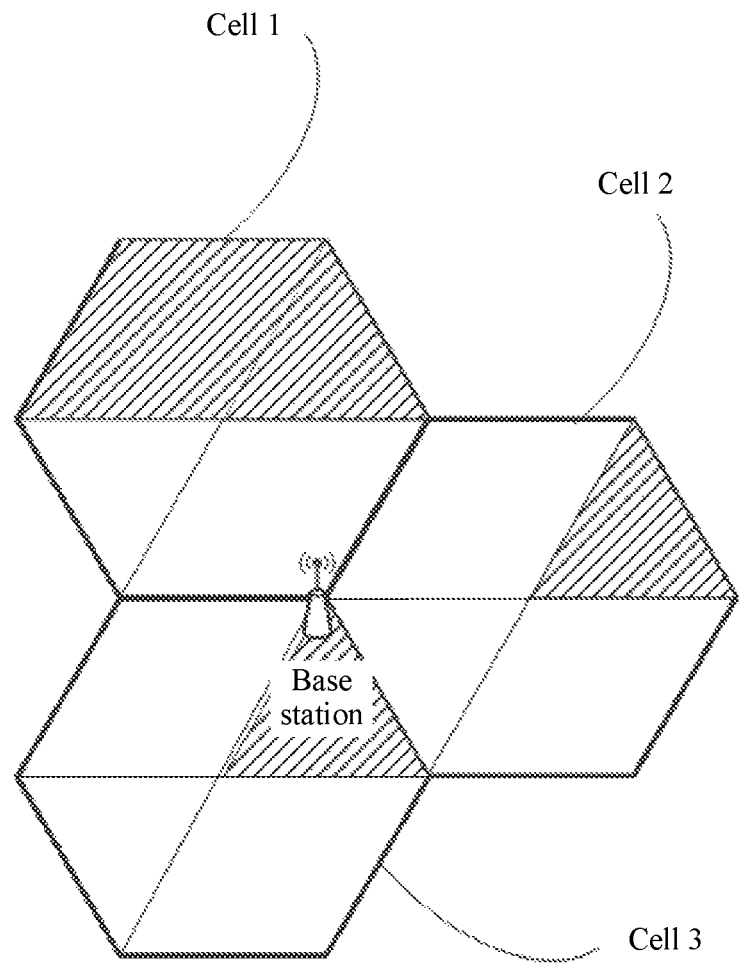
FIG. 5 is a schematic diagram of coverage zones preset to a covered state in a cell 1, a cell 2, and a cell 3 at a moment t1 according to an embodiment of the present invention.
Figure 5:
Figure 5:

Referring to FIG. 5, the coverage area of the base station is divided into three cells: a cell 1, a cell 2, and a cell 3. Each cell of the three cells is divided into four coverage zones. At a moment t1, the cell 1 has two coverage zones set to the covered state, each of the cell 2 and the cell 3 has one coverage zone set to the covered state, and coverage zones set to the covered state in the cell 1, the cell 2, and the cell 3 are not adjacent to each other.

Specified states of each coverage zone in the cell at various moments are periodic. Coverage zones set to the covered state at multiple moments can cover the entire cell, and at the multiple moments, the base station sends the data carried by the common channel to the entire cell. Therefore, the multiple moments may be used as a cycle, and the states of each coverage zone in the cell at various moments are set in the cycle. For a moment beyond the cycle, refer to the cycle.

Referring to FIG. 7, the coverage area of the base station is divided into three cells: a cell 1, a cell 2, and a cell 3. Each cell of the three cells is divided into four coverage zones. FIG. 7 shows coverage zones set to the covered state at a moment t1, a moment t2, a moment t3, a moment t4, and a moment t5 in each cell of the three cells. It can be seen from FIG. 7 that, from the moment t1 to the moment t4, coverage zones set to the covered state in each cell of the three cells separately cover the three cells, and a cycle is duration from the moment t1 to the moment t4. Therefore, coverage zones set to the covered state at the moment t5 are the same as those at the moment t1. Certainly, reference may also be made to FIG. 8 and FIG. 9.

In practical application, the base station may preset N patterns. Each pattern includes states of each coverage zone in the cell at various moments. A state of a coverage zone at one moment is the covered state or the silent state. N is an integer greater than or equal to 2, for example, N=3. That is, there are three patterns: a pattern 1, a pattern 2, and a pattern 3. FIG. 7 is the pattern 1, FIG. 8 is the pattern 2, and FIG. 9 is the pattern 3. During implementation, different patterns may be corresponding to different weighted values used for beamforming.

Optionally, if N patterns are preset, before performing step 101, the base station may further perform the following step.

The base station determines one pattern from the N patterns. The determined pattern includes states of each coverage zone in the cell at various moments. The state is the covered state or the silent state. The various moments include the current moment. N is an integer greater than or equal to 2, and the N patterns are predetermined by the base station.

For example, there are three preset coverage zone patterns: a pattern 1, a pattern 2, and a pattern 3. The base station determines the pattern 1 from the three preset coverage zone patterns. The pattern 1 is shown in FIG. 7.

Then, steps 101 to 103 are performed. Coverage zones set to the covered state in the cell at different moments are different. Therefore, the base station may perform beamforming on the data carried by the common channel to obtain common channel beams of the cell at different moments. Then, the common channel beams of the cell at different moments are sent to the coverage zones set to the covered state in the cell at different moments. A common channel beam of the cell at one moment points to a coverage zone set to the covered state in the cell at the moment.

Referring to FIG. 7, if the current moment is the moment t1, the base station performs beamforming on data carried by common channels to obtain common channel beams of the cell 1, the cell 2, and the cell 3 at the moment t1. The common channel beams of the cell 1, the cell 2, and the cell 3 at the moment t1 point to coverage zones set to the covered state in the cell 1, the cell 2, and the cell 3 at the moment t1 shown in FIG. 7. Then, the common channel beams of the cell 1, the cell 2, and the cell 3 at the moment t1 are sent to the coverage zones set to the covered state in the cell 1, the cell 2, and the cell 3 at the moment t1 shown in FIG. 7. The coverage zones set to the covered state in the cell 1, the cell 2, and the cell 3 at the moment t1 are the same as those at the moment t5. Therefore, the base station repeats, at the moment t5, the steps performed at the moment t1.

It can be learned from the foregoing descriptions that, in this embodiment of the present invention, an area covered by the data carried by the common channel is extremely flexible, and the area is no longer fixed to a sector that centers on the base station. A person of ordinary skill in the art can set coverage zones set to the covered state in the cell at different moments, so as to flexibly control the data carried by the common channel to be sent to different areas.

In this embodiment of the present invention, according to a design form of an antenna array of the base station, a manner of combining a transmit diversity and BF may be flexibly chosen to improve reception performance of UE. Step 102 includes:

The base station performs M different space time coding or space frequency coding on the data carried by the common channel to obtain M data streams; and the base station performs beamforming on the M data streams to obtain data streams corresponding to M common channel beams of the cell at the current moment.

Correspondingly, step 103 includes the following.

The base station sends the M common channel beams of the cell at the current moment to the coverage zone set to the covered state in the cell at the current moment.

Specifically, the antenna array of the base station may be divided into M groups. M may be 1, 2, 3, 4, or another integer. When M is equal to 1, it indicates that all antennas in the antenna array of the base station are used as one antenna group. In this case, only the BF is used, and the transmit diversity is not used. The base station performs beamforming on the data carried by the common channel to obtain a data stream corresponding to one common channel beam of the cell at one moment; then inputs the data stream corresponding to the common channel beam into the corresponding antenna group to form the common channel beam; and sends the common channel beam to a coverage zone set to the covered state in the cell at the moment by using the corresponding antenna group.

When M is greater than 1, it indicates that all antennas in the antenna array of the base station are grouped into M antenna groups. In this case, the transmit diversity and BF are used. The base station first performs M different space time coding or space frequency coding on the data carried by the common channel to obtain M data streams; performs beamforming on the M data streams with different weighting coefficients to obtain data streams corresponding to M common channel beams of the cell at one moment; inputs the data streams corresponding to the M common channel beams into corresponding antenna groups to form the M common channel beams; and sends the M common channel beams to a coverage zone set to the covered state in the cell at the moment by using the M antenna groups, so as to implement the transmit diversity on the data carried by the common channel.

Figure 10:
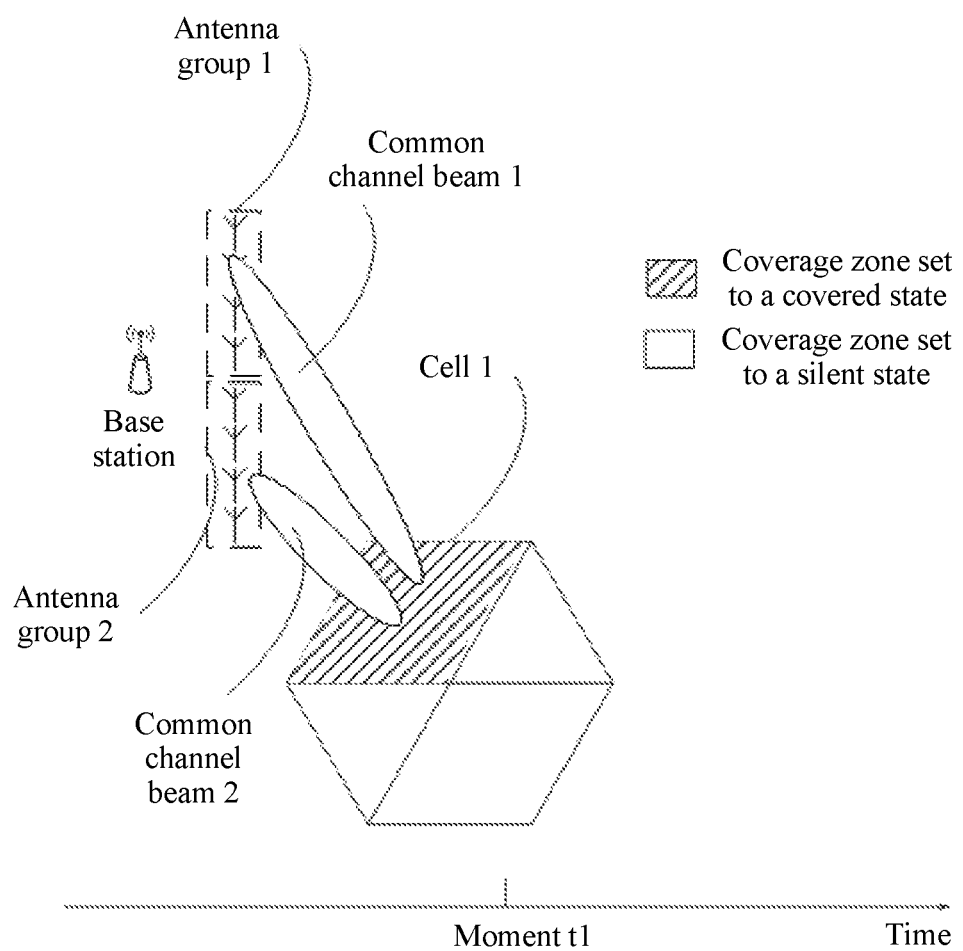
FIG. 10 is a schematic diagram of sending two common channel beams to a coverage zone preset to a covered state in a cell 1 at a moment t1 according to an embodiment of the present invention.

For example, M=2. The antenna array of the base station is divided into two antenna groups: an antenna group 1 and an antenna group 2. The base station first performs two different space time coding or space frequency coding on the data carried by the common channel to obtain two data streams: a data stream 1 and a data stream 2. FIG. 10 is used as an example. It is assumed that the current moment is a moment t1, beamforming with a weighting coefficient of a first value is performed to obtain a data stream corresponding to a common channel beam 1 of a cell 1 at the moment t1, and beamforming with a weighting coefficient of a second value is performed to obtain a data stream corresponding to a common channel beam 2 of the cell 1 at the moment t1. Then, the data stream corresponding to the common channel beam 1 is input into the antenna group 1 to form the common channel beam 1, and the data stream corresponding to the common channel beam 2 is input into the antenna group 2 to form the common channel beam 2. As shown in FIG. 10, the common channel beam 1 is sent, by using the antenna group 1, to a coverage zone set to the covered state in the cell 1 at the moment t1, and the common channel beam 2 is sent, by using the antenna group 2, to the coverage zone set to the covered state in the cell 1 at the moment t1.

Based on a same inventive concept, an embodiment of the present invention further provides a base station.

A base station (BS) may be a Base Transceiver Station (BTS) in Global System of Mobile communication (GSM) or Code Division Multiple Access (CDMA), an NodeB (NB) in Wideband Code Division Multiple Access (WCDMA), an Evolutional Node B or evolved NodeB (eNB or an eNodeB) in Long Term Evolution (LTE), a base station device in a future 5G network, or the like.

Figure 11:
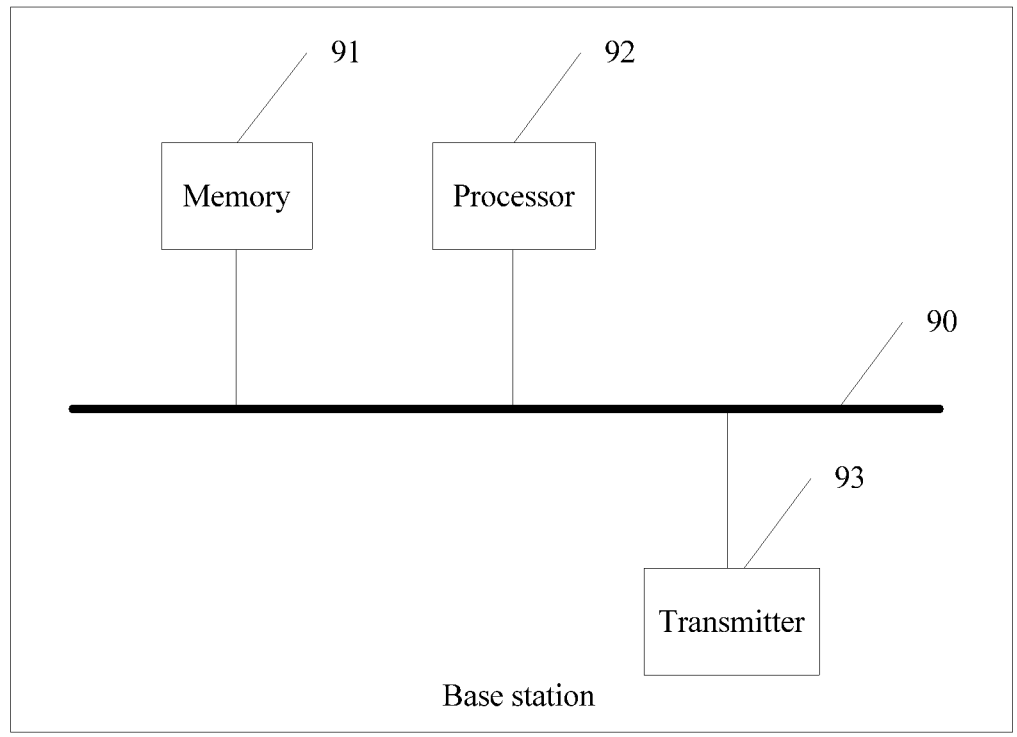
FIG. 11 is a schematic structural diagram of a base station according to an embodiment of the present invention.

Referring to FIG. 11, FIG. 11 is a schematic structural diagram of a base station according to an embodiment of the present invention. The base station includes: a bus 90, a memory 91, a processor 92, and a transmitter 93. The base station may further include an antenna array. The memory 91 and the transmitter 93 are connected to the processor 92 by using the bus 90.

The processor 92 may be specifically an application-specific integrated circuit (ASIC), one or more integrated circuits configured to control program execution, or a hardware circuit developed by using a field programmable gate array (FPGA). There may be one or more memories 91. The memory 91 may include a read-only memory (ROM), a random access memory (RAM), or a magnetic disk storage. These memories are connected to the processor 91 by using the bus 90. The transmitter 93 may communicate with an external device by using the antenna array.

Optionally, the base station may be used to implement the data sending method shown in FIG. 3 in the present invention. Specific configuration may be determined according to an actual requirement.

Specifically, when the base station is configured to implement the data sending method shown in FIG. 3 in an embodiment of the present invention, the memory 91 is configured to store coverage zones set to a covered state in a cell at different moments, where the cell includes multiple coverage zones, there is at least one coverage zone set to the covered state in the cell at one moment, and coverage zones set to the covered state in the cell at different moments are different.

The processor 92 is connected to the memory 91 by using the bus 90, and configured to perform the steps in the foregoing method embodiment. For example, the processor 92 is configured to determine a coverage zone set to the covered state in the cell at a current moment; and perform beamforming on data carried by a common channel to obtain a data stream corresponding to a common channel beam of the cell at the current moment, where the common channel beam of the cell at the current moment points to the coverage zone set to the covered state in the cell at the current moment.

The transmitter 93 is connected to the processor 92 using the bus 90, and configured to perform transmission under control of the processor. For example, the transmitter 93 is configured to input the data stream corresponding to the common channel beam of the cell at the current moment into a corresponding antenna group to form the common channel beam, where the antenna group sends the common channel beam to the coverage zone set to the covered state in the cell at the current moment.

Optionally, the transmitter 93 may include the antenna array, for example, an antenna array in an active antenna system.

Optionally, the base station may include the antenna array.

Optionally, a line segment between any point on an edge of the cell and a point at which the base station is located crosses over at least two coverage zones included in the cell.

Optionally, a coverage area of the base station includes multiple cells, and coverage zones set to the covered state in any two neighboring cells in the multiple cells at a same moment are not adjacent to each other.

Optionally, the processor 92 is configured to perform M different space time coding or space frequency coding on the data carried by the common channel to obtain M data streams, where M is an integer greater than or equal to 1; and perform beamforming on the M data streams to obtain M common channel beams of the cell at the current moment.

Optionally, the processor 92 is further configured to set states of each coverage zone in the cell at various moments, where the state of each coverage zone in the cell is set to the covered state or a silent state, the various moments include the current moment, and N is an integer greater than or equal to 2.

With reference to the foregoing embodiments, the processor 92 is configured to perform the steps in any one of implementations of the foregoing data sending method, and the transmitter 93 is configured to perform transmission under the control of the processor.

Various variation manners and specific instances in the data sending method in the embodiment shown in FIG. 3 are also applicable to the base station in this embodiment. With the foregoing detailed descriptions of the data sending method, a person skilled in the art can clearly know the implementations of the base station in this embodiment. Therefore, for conciseness of the specification, details are not described herein.

Based on a same inventive concept, an embodiment of the present invention further provides a data sending apparatus. Optionally, the apparatus may be the base station in the foregoing embodiment.

Figure 12:
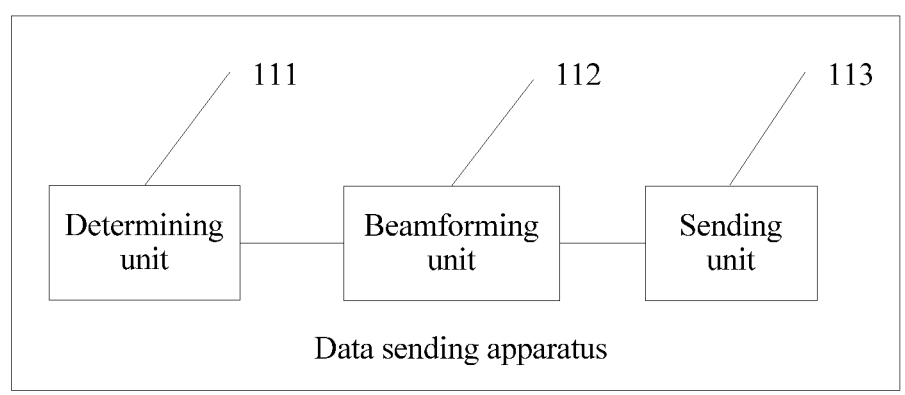
FIG. 12 is a schematic block diagram of a data sending apparatus according to an embodiment of the present invention.

Referring to FIG. 12, FIG. 12 is a schematic function block diagram of a data sending apparatus according to an embodiment of the present invention. The apparatus includes: a determining unit 111, configured to determine a coverage zone set to a covered state in a cell at a current moment, where the cell includes multiple coverage zones, there is at least one coverage zone set to the covered state in the cell at one moment, and coverage zones set to the covered state in the cell at different moments are different; a beamforming unit 112, configured to perform beamforming on data carried by a common channel to obtain a common channel beam of the cell at the current moment, where the common channel beam of the cell at the current moment points to the coverage zone set to the covered state in the cell at the current moment; and a sending unit 113, configured to send the common channel beam of the cell at the current moment to the coverage zone set to the covered state in the cell at the current moment.

Optionally, a line segment between any point on an edge of the cell and a point at which the apparatus is located crosses over at least two coverage zones in the cell.

Optionally, a coverage area of the apparatus includes multiple cells, and coverage zones set to the covered state in any two neighboring cells in the multiple cells at a same moment are not adjacent to each other.

Optionally, the apparatus further includes: a coding unit, configured to perform M different space time coding or space frequency coding on the data carried by the common channel to obtain data streams corresponding to M data streams.

The beamforming unit is configured to perform beamforming on the M data streams to obtain M common channel beams of the cell at the current moment.

Optionally, the apparatus further includes: a setting unit, configured to set states of each coverage zone in the cell at various moments, where the state of each coverage zone in the cell is set to the covered state or a silent state, the various moments include the current moment, and N is an integer greater than or equal to 2.

Various variation manners and specific instances in the foregoing embodiments are also applicable to the data sending apparatus in this embodiment. With the foregoing detailed descriptions in the foregoing embodiments, a person skilled in the art can clearly know the implementations of the data sending apparatus in this embodiment. Therefore, for conciseness of the specification, details are not described herein.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, comprising:
   determining, by a base station, a first coverage zone that is set to a covered state in a first cell of the base station at a current moment, wherein the first cell of the base station comprises a plurality of coverage zones including the first coverage zone, there is at least one coverage zone of the plurality of coverage zones set to the covered state in the first cell at any given moment, and coverage zones set to the covered state in the first cell at different moments are different, and wherein the at least one coverage zone of the plurality of coverage zones comprises a perimeter that defines the at least one coverage zone, wherein a portion of the perimeter that is closest to the base station is physically separate from and does not touch the base station;
   performing, by the base station, beamforming on data carried by a common channel to obtain a common channel beam of the first cell at the current moment, wherein the common channel beam of the first cell at the current moment points to the first coverage zone that is set to the covered state in the first cell at the current moment, wherein the common channel beam excludes a rotary narrow beam that rotates around the base station at a preset radian rate, and wherein the first coverage zone to which the common channel beam points at the current moment does not overlap with any other zone of the plurality of coverage zones in the first cell of the base station; and
   sending, by the base station, the common channel beam of the first cell at the current moment to the first coverage zone that is set to the covered state in the first cell at the current moment.

2. The method according to claim 1, wherein a shortest distance between a point on an edge of the first cell and the base station crosses over at least two coverage zones of the plurality of coverage zones comprised in the first cell, and wherein the at least two coverage zones do not overlap with each other.

3. The method according to claim 1, wherein a coverage area of the base station comprises a plurality of cells of the base station, the plurality of cells includes the first cell, and coverage zones set to the covered state in any two neighboring cells of the base station in the plurality of cells at a same moment are not adjacent to each other.

4. The method according to claim 1, wherein performing, by the base station, beamforming on the data carried by the common channel to obtain the common channel beam of the first cell at the current moment comprises:
   performing, by the base station, M different space time coding or space frequency coding on the data carried by the common channel to obtain M data streams, wherein M is an integer greater than or equal to 1; and
   performing, by the base station, beamforming on the M data streams to obtain data streams corresponding to M common channel beams of the first cell at the current moment.

5. The method according to claim 1, wherein before determining, by the base station, the at least one coverage zone set to the covered state in the first cell at the current moment, the method further comprises:
   setting, by the base station at a plurality of moments, states of each coverage zone of the plurality of coverage zones in the first cell, wherein at each moment of the plurality of moments a state of each coverage zone of the plurality of coverage zones in the first cell is set to the covered state or a silent state, and the plurality of moments comprises the current moment.

6. A base station, including:
a non-transitory memory, configured to store a plurality of states for each of a plurality of coverage zones in a first cell of the base station, wherein the plurality of states comprises a covered state and a silent state, each of the plurality of coverage zones is set to the silent state or the covered state in each moment of a plurality of moments, at least one of the plurality of coverage zones is set to the covered state in each moment of the plurality of moments, and, at different moments of the plurality of moments, different coverage zones are set to the covered state, and wherein at least one coverage zone of the plurality of coverage zones comprises a perimeter that defines the at least one coverage zone, wherein a portion of the perimeter that is closest to the base station is physically separate from and does not touch the base station;
a processor, connected to the non-transitory memory using a bus, wherein the processor is configured to:
determine a first coverage zone of the plurality of coverage zones that is set to the covered state in the first cell at a current moment of the plurality of moments; and
perform beamforming on data carried by a common channel to obtain a common channel beam of the first cell at the current moment, where the common channel beam of the first cell at the current moment points to the first coverage zone that is set to the covered state in the first cell at the current moment, wherein the common channel beam excludes a rotary narrow beam that rotates around the base station at a preset radian rate, and wherein the first coverage zone to which the common channel beam points at the current moment does not overlap with any other zone of the plurality of coverage zones in the first cell of the base station; and
a transmitter, connected to the processor using the bus, wherein the transmitter is configured to send the common channel beam of the first cell at the current moment to the first coverage zone that is set to the covered state in the first cell at the current moment.

7. The base station according to claim 6, wherein a shortest distance between a point on an edge of the first cell and the base station crosses over at least two coverage zones included in the first cell, wherein the at least two coverage zones do not overlap with each other.

8. The base station according to claim 6, wherein a coverage area of the base station includes a plurality of cells of the base station, the plurality of cells includes the first cell, and coverage zones set to the covered state in any two neighboring cells of the base station in the plurality of cells at a same moment are not adjacent to each other.

9. The base station according to claim 6, wherein the processor being configured to perform beamforming on the data carried by the common channel to obtain the common channel beam of the first cell at the current moment comprises the processor being configured to:
perform M different space time coding or space frequency coding on the data carried by the common channel to obtain M data streams, where M is an integer greater than or equal to 1; and
perform beamforming on the M data streams to obtain data streams corresponding to M common channel beams of the first cell at the current moment.

10. The base station according to claim 6, wherein the processor is further configured to:
set a state of each coverage zone of the plurality of coverage zones in the first cell at each of the plurality of moments.

11. A non-transitory storage medium comprising instructions which, when executed by a computer, cause the computer to:
determine a first coverage zone that is set to a covered state in a first cell of a base station at a current moment, wherein the first cell of the base station comprises a plurality of coverage zones, the plurality of coverage zones includes the first coverage zone, at least one of the plurality of coverage zones is physically separate from and does not touch the base station that comprises the computer, there is at least one coverage zone of the plurality of coverage zones that is set to the covered state in the first cell at any given moment, and coverage zones set to the covered state in the first cell at different moments are different, and wherein the at least one coverage zone of the plurality of coverage zones comprises a perimeter that defines the at least one coverage zone, wherein a portion of the perimeter that is closest to the base station is physically separate from and does not touch the base station;
performing beamforming on data carried by a common channel to obtain a common channel beam of the first cell at the current moment, wherein the common channel beam of the first cell at the current moment points to the first coverage zone that is set to the covered state in the first cell at the current moment, wherein the common channel beam excludes a rotary narrow beam that rotates around the base station at a preset radian rate, and wherein the first coverage zone to which the common channel beam points at the current moment does not overlap with any other zone of the plurality of coverage zones in the first cell of the base station; and
sending the common channel beam of the first cell at the current moment to the first coverage zone that is set to the covered state in the first cell at the current moment.

12. The non-transitory storage medium according to claim 11, wherein a shortest distance between a point on an edge of the first cell and the base station crosses over at least two coverage zones comprised in the first cell, and wherein the at least two coverage zones do not overlap.

13. The non-transitory storage medium according to claim 11, wherein a coverage area of the base station comprises a plurality of cells of the base station, the plurality of cells includes the first cell, and coverage zones set to the covered state in any two neighboring cells of the base station in the plurality of cells at a same moment are not adjacent to each other.

14. The non-transitory storage medium according to claim 11, wherein performing, by the base station, beamforming on the data carried by the common channel to obtain the common channel beam of the first cell at the current moment comprises:
performing M different space time coding or space frequency coding on the data carried by the common channel to obtain M data streams, wherein M is an integer greater than or equal to 1; and
performing beamforming on the M data streams to obtain data streams corresponding to M common channel beams of the first cell at the current moment.

15. The non-transitory storage medium according to claim 11, wherein instructions, when executed by the computer, further cause the computer to:

before determining the first coverage zone that is set to the covered state in the first cell at the current moment, set states of each coverage zone of the plurality of coverage zones in the first cell in a plurality of moments, wherein in each of the plurality of moments the state of each coverage zone of the plurality of coverage zones in the first cell is set to the covered state or a silent state, and the plurality of moments comprises the current moment.

16. The method according to claim 1, wherein none of the plurality of coverage zones overlap.

17. The method according to claim 1, wherein after a plurality of moments, the common channel beam of the first cell at the current moment has sequentially pointed to multiple coverage zones of the plurality of coverage zones.

18. The base station according to claim 6, wherein an area covered by the plurality of coverage zones is an area of the first cell, and wherein none of the plurality of coverage zones overlap.

19. The base station according to claim 6, wherein after the plurality of moments, the common channel beam of the first cell at the current moment has sequentially pointed to multiple coverage zones of the plurality of coverage zones.

20. The base station according to claim 6, wherein in the plurality of moments each coverage zone of the plurality of coverage zones is set to the covered state in at least one moment and the silent state in at least another moment.

* * * * *